(12) United States Patent  (10) Patent No.: US 7,856,406 B2
Leventhal  (45) Date of Patent: Dec. 21, 2010

(54) SYSTEM AND METHOD FOR MANAGING ACCOUNTS PAYABLE AND ACCOUNTS RECEIVABLE

(75) Inventor: Jeffrey P. Leventhal, Boca Raton, FL (US)

(73) Assignee: OnForce, Inc., Lexington, MA (US)

( * ) Notice: Subject to any disclaimer, the term of this patent is extended or adjusted under 35 U.S.C. 154(b) by 1341 days.

(21) Appl. No.: 10/755,727

(22) Filed: Jan. 12, 2004

(65) Prior Publication Data

US 2004/0260631 A1    Dec. 23, 2004

Related U.S. Application Data

(63) Continuation-in-part of application No. 10/692,181, filed on Oct. 23, 2003, now abandoned.

(60) Provisional application No. 60/465,977, filed on Apr. 28, 2003.

(51) Int. Cl.
 *G06Q 20/00* (2006.01)
(52) U.S. Cl. .................. 705/77; 705/78; 705/79
(58) Field of Classification Search .............. 705/77–79
See application file for complete search history.

(56) References Cited

U.S. PATENT DOCUMENTS

| | | | |
|---|---|---|---|
| 4,384,851 A | 5/1983 | McAndrews | |
| 4,630,201 A | 12/1986 | White | |
| 4,637,796 A | 1/1987 | Korn | |
| 4,741,696 A | 5/1988 | Cetlin | |
| 4,802,849 A | 2/1989 | Collins, Jr. | |
| 4,846,501 A | 7/1989 | Del Grande | |
| 4,858,143 A | 8/1989 | Fournier | |
| 4,886,451 A | 12/1989 | Cetlin | |
| 5,220,501 A | 6/1993 | Lawlor et al. | |
| 5,283,829 A | 2/1994 | Anderson | |
| 5,310,340 A | 5/1994 | Zedda | |
| 5,383,113 A | 1/1995 | Kight et al. | |
| 5,465,206 A | 11/1995 | Hilt et al. | |
| 5,787,000 A | 7/1998 | Lilly et al. | |

(Continued)

FOREIGN PATENT DOCUMENTS

| | | |
|---|---|---|
| EP | 0261816 A2 | 3/1988 |
| WO | WO 97/29445 | 8/1997 |
| WO | WO 00/57299 A3 | 9/2000 |
| WO | WO/2004-097575 | 11/2004 |
| WO | WO 2004/097580 | 11/2004 |

OTHER PUBLICATIONS

PayPal (www.paypal.com) citing http://computer.howstuffworks.com/paypal (13 pags) from the attached Examiner's Report submitted to the Australian Patent Office in related Australian application No. 2004235043 (dated Jul. 3, 2009).

(Continued)

*Primary Examiner*—Ramsey Refai
(74) *Attorney, Agent, or Firm*—Blank Rome LLP

(57) ABSTRACT

A system and method for managing accounts payable that allocates at least a portion of an invoiced dollar amount to a virtual account associated with a vendor, allows the vendor to request that a dispersal dollar amount be transferred from the virtual account to a real account associated with the vendor, and initiates an electronic transfer of the dispersal dollar amount from a real account to the real account associated with the vendor.

45 Claims, 20 Drawing Sheets

U.S. PATENT DOCUMENTS

| | | | |
|---|---|---|---|
| 5,799,284 | A | 8/1998 | Bourquin |
| 5,864,483 | A | 1/1999 | Brichta |
| 5,871,350 | A | 2/1999 | Clark et al. |
| 5,940,807 | A | 8/1999 | Purcell |
| 5,983,200 | A | 11/1999 | Slotznick |
| 6,003,078 | A | 12/1999 | Kodimer et al. |
| 6,006,199 | A | 12/1999 | Berlin et al. |
| 6,041,312 | A | 3/2000 | Bickerton et al. |
| 6,044,362 | A | 3/2000 | Neely |
| 6,088,626 | A | 7/2000 | Lilly |
| 6,095,477 | A | 8/2000 | Pohlman |
| 6,343,738 | B1* | 2/2002 | Ogilvie .................. 705/26 |
| 6,360,211 | B1 | 3/2002 | Anderson |
| 6,381,587 | B1 | 4/2002 | Guzelsu |
| 6,397,197 | B1 | 5/2002 | Gindlesperger |
| 6,466,914 | B2 | 10/2002 | Mitsuoka et al. |
| 6,491,519 | B1 | 12/2002 | Clark et al. |
| 6,505,164 | B1 | 1/2003 | Brunsting et al. |
| 6,594,647 | B1* | 7/2003 | Randle et al. ............... 705/77 |
| 6,633,900 | B1 | 10/2003 | Khalessi et al. |
| 6,684,191 | B1 | 1/2004 | Barnard et al. |
| 6,687,677 | B1 | 2/2004 | Barnard et al. |
| 6,714,915 | B1 | 3/2004 | Barnard et al. |
| 6,738,746 | B1 | 5/2004 | Barnard et al. |
| 6,754,605 | B1 | 6/2004 | Pate et al. |
| 6,978,253 | B2* | 12/2005 | Lin .......................... 705/26 |
| 7,089,208 | B1* | 8/2006 | Levchin et al. ............. 705/39 |
| 7,092,913 | B2* | 8/2006 | Cannon, Jr. ................ 705/27 |
| 7,096,193 | B1 | 8/2006 | Beaudoin et al. |
| 7,213,064 | B2* | 5/2007 | Smith et al. ............... 705/30 |
| 7,363,250 | B2* | 4/2008 | Nagel et al. ................ 705/26 |
| 2001/0034660 | A1 | 10/2001 | Heumann |
| 2001/0056389 | A1 | 12/2001 | Fair et al. |
| 2002/0010615 | A1 | 1/2002 | Jacobs |
| 2002/0019757 | A1 | 2/2002 | Dodt et al. |
| 2002/0026407 | A1 | 2/2002 | Neubert |
| 2002/0040352 | A1 | 4/2002 | McCormick |
| 2002/0065759 | A1 | 5/2002 | Boies et al. |
| 2002/0069079 | A1 | 6/2002 | Vega |
| 2002/0073012 | A1 | 6/2002 | Lowell et al. |
| 2002/0087680 | A1 | 7/2002 | Cerami et al. |
| 2002/0095372 | A1 | 7/2002 | Likourezos et al. |
| 2002/0103731 | A1 | 8/2002 | Barnard et al. |
| 2002/0111842 | A1 | 8/2002 | Miles |
| 2002/0120846 | A1* | 8/2002 | Stewart et al. ............... 705/77 |
| 2002/0153134 | A1 | 10/2002 | Newman |
| 2002/0174033 | A1 | 11/2002 | Lin |
| 2002/0184147 | A1* | 12/2002 | Boulger .................... 705/40 |
| 2002/0194112 | A1 | 12/2002 | dePinto et al. |
| 2003/0040990 | A1 | 2/2003 | Lee et al. |
| 2003/0069797 | A1 | 4/2003 | Harrison |
| 2003/0115126 | A1 | 6/2003 | Pitroda |
| 2003/0126057 | A1 | 7/2003 | Grossi et al. |
| 2003/0130820 | A1 | 7/2003 | Lane |
| 2003/0149645 | A1 | 8/2003 | Flynn et al. |
| 2003/0154118 | A1 | 8/2003 | Druyan et al. |
| 2003/0182206 | A1 | 9/2003 | Hendrix et al. |
| 2003/0212617 | A1 | 11/2003 | Stone et al. |
| 2004/0014479 | A1 | 1/2004 | Milman |
| 2004/0073503 | A1 | 4/2004 | Morales et al. |
| 2004/0117154 | A1 | 6/2004 | Lane et al. |
| 2004/0117155 | A1 | 6/2004 | Lane et al. |
| 2004/0199466 | A1* | 10/2004 | Chi .......................... 705/42 |
| 2005/0015501 | A1 | 1/2005 | Kaplan et al. |
| 2005/0048433 | A1 | 3/2005 | Hilliard |
| 2005/0244768 | A1 | 11/2005 | Taub et al. |
| 2005/0260534 | A1 | 11/2005 | Belfor et al. |

OTHER PUBLICATIONS

Investorwords.com, Electronic Funds Transfer Definition, available at http://www.investorwords.com/1680/Electronic_Funds_Transfer.hrml, accessed Mar. 12, 2009.

Electronic Fund Transfer Act, 15 U.S.C. § 1693(a) (2006) available at <http://frwebgate.access.gpo.gov/cgl-bln/usc.cgi?ACTION-RETRIEVE&FILE-$$xa$$busc15.wals&start=8592872&SIZE=6054&TYPE=TEXT>, accessed Mar. 12, 2009.

* cited by examiner

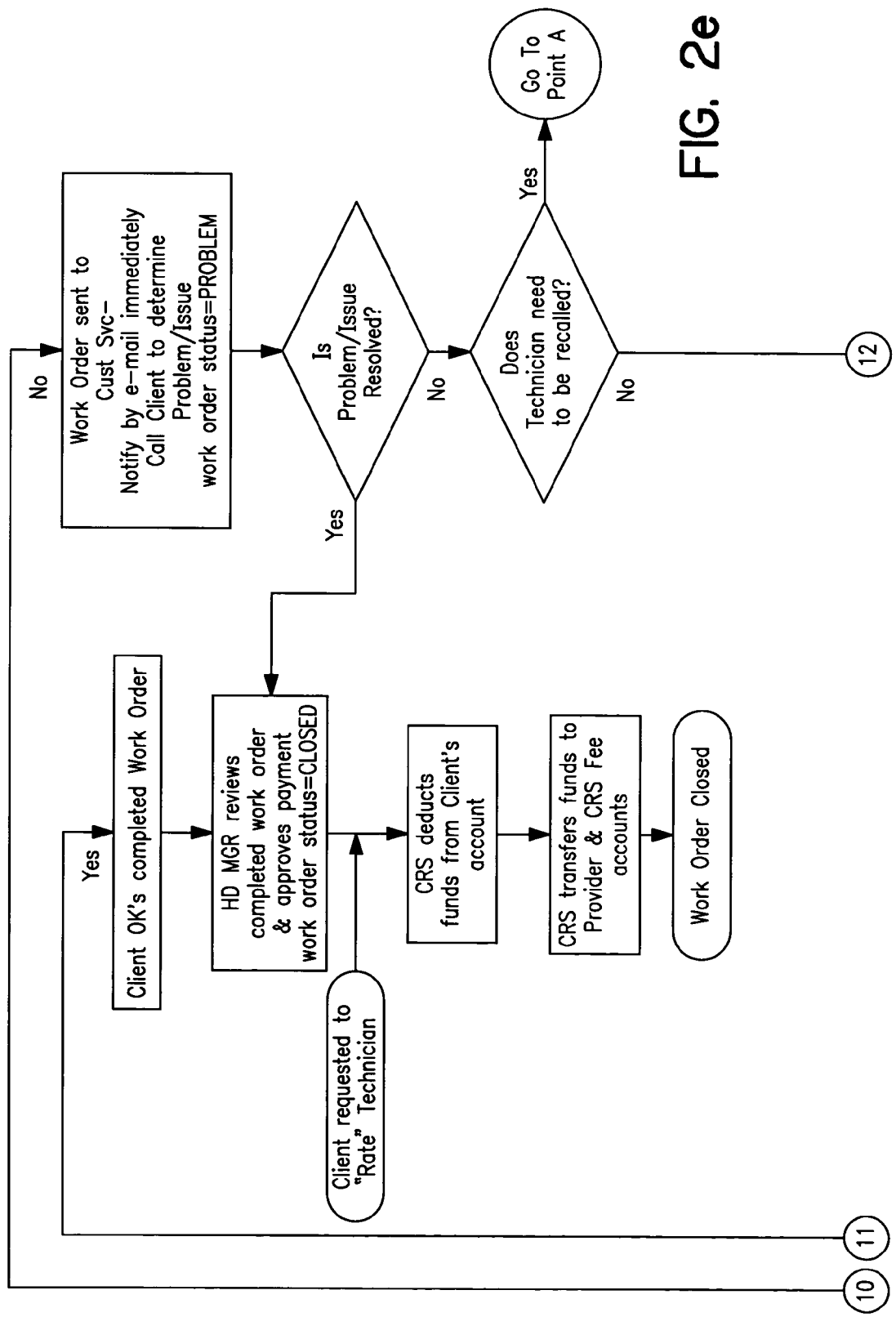

COMPUTERREPAIR.COM

CONTACT US

FIND A PROVIDER: [enter zip code] [GO▶]

PROVIDER SEARCH    PROVIDER SIGN-UP    ON-LINE OFFICE    FEEDBACK

ComputerRepair.com Home>ON-LINE OFFICE                    gabemiano@hotmail.com logged in  Logout Create ①Account ······∴·Setup an ②Line Office ········ Provide Service ③ Details

Setup an On-Line Office

Please fill out your personal profile.

After you have completed your initial signup, you may modify this information from within your On-Line Office.

Create Your Profile

| Address 1 | |
| Address 2 | |
| City * | |
| State * | -Select- |
| Zip Code * | [  ] - [  ] |
| Number of years in business * | |
| Do you stock parts? * | |
| How did you hear about us? | |
| Website URL | http:// |

Service Response Time *

Enter a brief description of the services you can provide within the time frames below if a particular time frames does not apply leave it blank.

| Under 2 hours | |
| 2-4 hours | |
| 4-8 hours | |
| Within 24 hours | |

Brochure/Resume

Upload your text (txt) format brochure or resume
(File should be less than 50K)

[          ] [Browse...]

Logo/Photo

Upload your company logo or a personal photo for public display.
If a Team Member doesn't have their own photo, this image will be displayed
(Image should be less than 20K and have a max width/height of 175 pixels)

[          ] [Browse...]

About Me

Please provide potential clients with a summary of your company's background
Text should be 500 characters or less.

[                    ]

* required

[ CREATE PROFILE ]

Our Company | Feedback | Tell A Friend | Policies

| Choose a Support Time Frame for the Work Order | Provider | Dist. | Types of Service |
|---|---|---|---|
| Time Frame:<br>under 2 hours | Daria Miano<br>CompuNardz Tech Repair<br>Redondo Beach, CA | 0 mi. | Software/Data Xfer/Anth<br>Wiring—$60<br>Networking/Email/Intern<br>Hardware Repair—$50 |
| Select a Support Type Category | Jon Williams<br>Mr. Foit Tech Solutions<br>Hermosa Beach, CA | 2.49 mi. | Software/Data Xfer/Anth<br>Wiring—$75<br>Networking/Email/Intern<br>Hardware Repair—$90 |
| Support Type:<br>Software Service | | | |
| Enter a Description of the Service Required | Robert Smith<br>A-1 Computer Service<br>Hermosa Beach, CA | 2.49 mi. | Software/Data Xfer/Anth<br>Wiring—$90<br>Networking/Email/Intern<br>Hardware Repair—$85 |
| Please enter a description of the problem encountered or the service required:<br>Description: | | | |
| | Marcy Wright<br>☆☆☆☆☆<br>(1 review)<br>Harbor City, CA | 5.32 mi. | Software/Data Xfer/Anth<br>Networking/Email/Intern<br>Hardware Repair—$50<br>Printer Repair—$50 |
| | Dave Brownlow | 6.12 | Software/Data Xfer/Anth |

FIG. 9

| Manage Your Online Office | Rates |
|---|---|
| ⁞• Manage Your Account<br><br>Modify your company profile<br>Change your password<br><br>⁞• Manage Team Members<br>Add team member<br>Modify team member<br>⁞ Choose team member: [Mia Gabe--gabe@nco.com ▲▼] [go] | Please choose a rate for each type of service chosen<br><br>Software/Data Xfer/Antivirus/Backups: [$85/hr.]<br>Wiring: [Choose Rate ▲▼]<br>Networking/Email/Internet: [Choose Rate ▲▼]<br>Hardware Repair: [Choose Rate ▲▼]<br>Printer Repair: [Choose Rate ▲▼] |

FIG. 10

| Technician: Feedback |
|---|

Technician: Gene Mana of Miami, FL
Reviewers: 7
Overall Rating: ☆ ☆ ☆ ☆ ☆

| Feedback History | |
|---|---|
| Date of Service: August 3, 2003 | |
| The Technician Was Able To Communicate Clearly | ☆ ☆ ☆ ☆ ☆ ☆ |
| The Technician's Appearance & Conduct Was Professional | ☆ ☆ ☆ ☆ ☆ ☆ |
| | ☆ ☆ ☆ ☆ ☆ ☆ |

FIG. 11

SYSTEM AND METHOD FOR MANAGING ACCOUNTS PAYABLE AND ACCOUNTS RECEIVABLE

RELATED APPLICATIONS

This application is a continuation-in-part of U.S. application Ser. No. 10/692,181, filed Oct. 23, 2003, which in turn claims the benefit of U.S. Provisional patent application Ser. No. 60/465,977 filed Apr. 28, 2003 which applications are incorporated herein by reference in their entirety.

BACKGROUND

The subject invention relates generally to a system and method for managing accounts payable and accounts receivable.

As described in U.S. Pat. No. 6,044,362, invoicing and payment collection has always been a very labor intensive and paper intensive process. Typically the process has involved an invoicer, usually a business, who prepares an invoice detailing the goods and services provided and the charges therefor. The invoice is mailed to a customer who verifies the correctness of the invoice and returns a payment coupon of some type along with a paper check to the invoicer. The invoicer then submits the paper check to its bank for payment through, for example, the Automated Clearing House (ACH) network. Other similar payment systems include writing a credit card number and endorsing and preauthorization to draft an account on a monthly basis up to preset limits, such as regularly paying utility bills from a checking account.

To automate this process, attempts have been made to utilize the services of third parties that receive and transmit between the invoicer and the banks involved electronic information relating to payments due from a customer. Although these systems appear to streamline the process, they, in fact, may add a great deal of complexity and no small amount of expense to the process. Such electronic systems are described in, for example, U.S. Pat. No. 5,383,113; U.S. Pat. No. 5,283,829; U.S. Pat. No. 5,220,501; and U.S. Pat. No. 5,465,206.

Still further, U.S. Pat. No. 6,044,362 describes an electronic invoicing and payment system for providing customers an opportunity to review and modify payment instructions carried out by the invoicer (i.e., a vendor of goods and/or services). The described system includes invoice presentment electronics having a control system and at least one remote authorization terminal having a customer interface. The control system of the invoice presentment electronics is adapted to provide billing data to the remote authorization terminal whereby the customer interface may be used to provide a response indicating one of acceptance of the billing data for automated billing or modification of the billing data for modifying automated billing.

While the aforementioned systems generally work for their intended purpose, they do, however, suffer the disadvantage that the systems are customer-centric, i.e., the customer is required to manage all information pertaining to the accounts payable process. It will also be appreciated that, in such systems, the vendor is placed at the disadvantage of not being able to gain access to information related to accounts payable, e.g., to view the status of outstanding invoices. Accordingly, a need exists for a system and method that will allow a vendor to have increased participation in the accounts payable process. More specifically, a need exists for a system and method that will allow a vendor access to their own accounts payable records with a customer, e.g., to view invoice status, to initiate payments for goods and/or services, etc.

SUMMARY

To address this and other needs, described hereinafter is an improved system and method for managing accounts payable and accounts receivable. In particular, the method may be implemented in a third party system, preferably accessible via the Internet, that functions to allocate at least a portion of an invoiced dollar amount to a virtual account associated with a vendor (e.g., when an invoice including the invoiced dollar amount is approved by a customer), allow the vendor to request that a dispersal dollar amount be transferred from a deposit account maintained by the third party to a real account owned by the vendor (e.g., by interacting with the system to cause an electronic payment to be made), and using a computer at the third party to initiate an electronic transfer of the dispersal dollar amount from the deposit account maintained by the third party that includes funds deposited by the customer to the real account owned by the vendor.

A better understanding of the objects, advantages, features, properties and relationships of the subject system and method will be obtained from the following detailed description and accompanying drawings which set forth illustrative embodiments which are indicative of the various ways in which the principles of the system and method may be employed.

BRIEF DESCRIPTION OF THE DRAWINGS

For a better understanding of the system and method for managing service requests, reference may be had to preferred embodiments shown in the following drawings in which:

FIGS. 6-8 illustrate exemplary screen shots of Web pages by which a client service provider may register with the subject system;

FIG. 9 illustrates an exemplary screen shot of a Web page by which a service requestor may indicate a desire to have a service request fulfilled;

FIG. 10 illustrates an exemplary screen shot of a Web page for use in managing a service provider on-line office;

FIG. 11 illustrates an exemplary screen shot of a service provider rating; and

DETAILED DESCRIPTION

Figure 1:
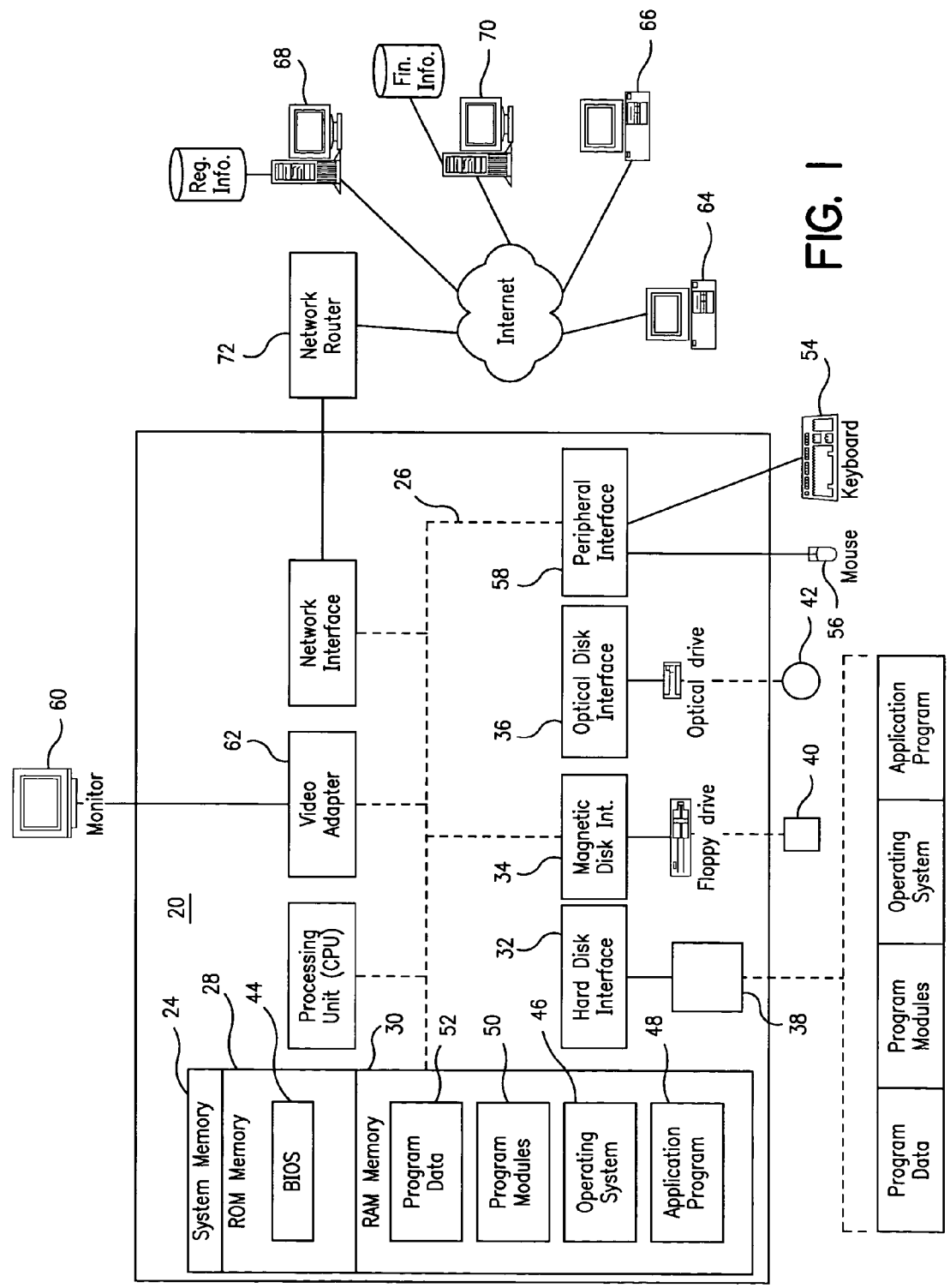
FIG. 1 illustrates a block diagram of an exemplary computer system in which the principles of the subject invention may be employed.
Figure 2A:
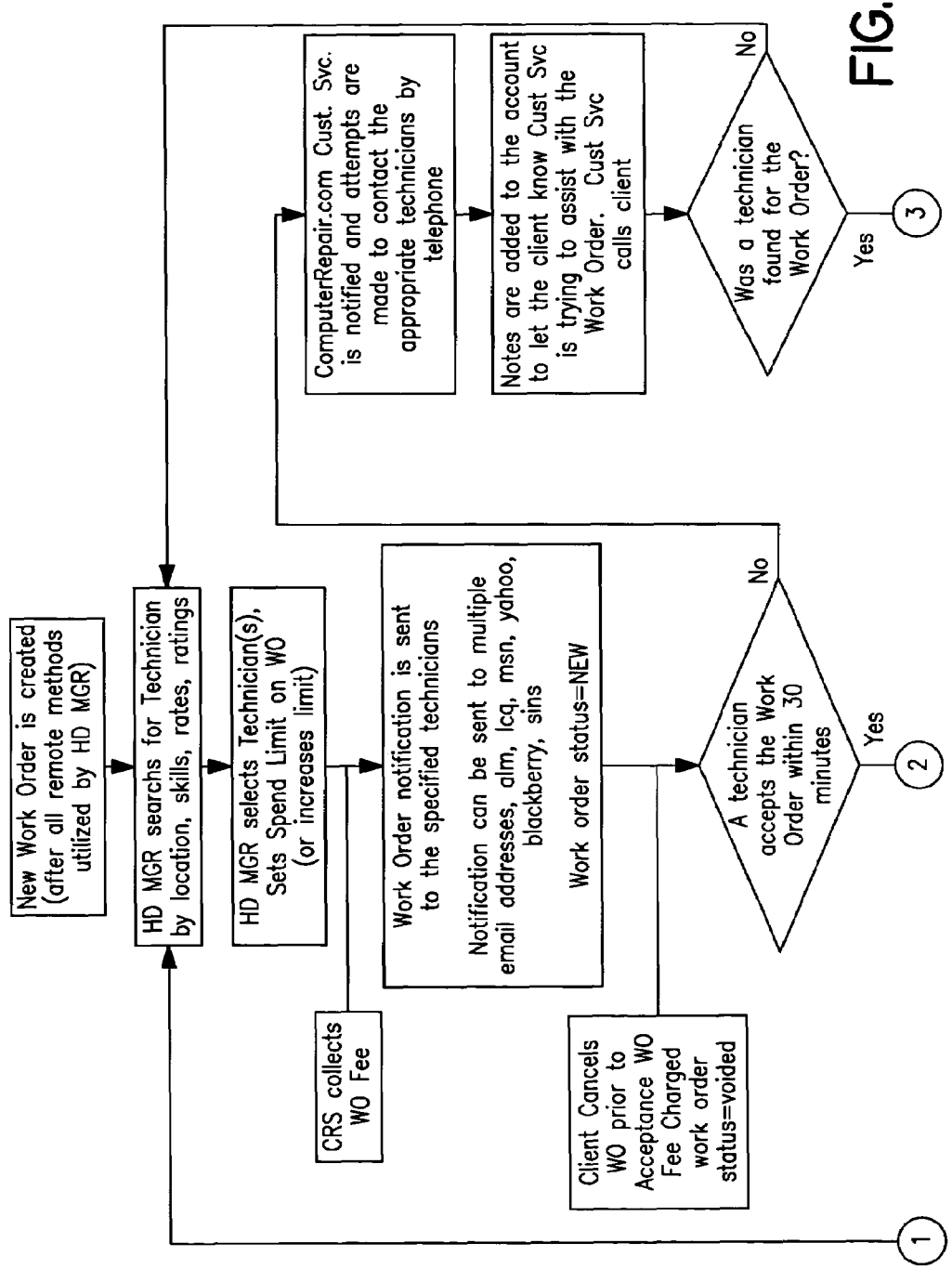
FIG. 2 illustrates a flow chart diagram of an exemplary method for managing service requests.
Figure 2B:
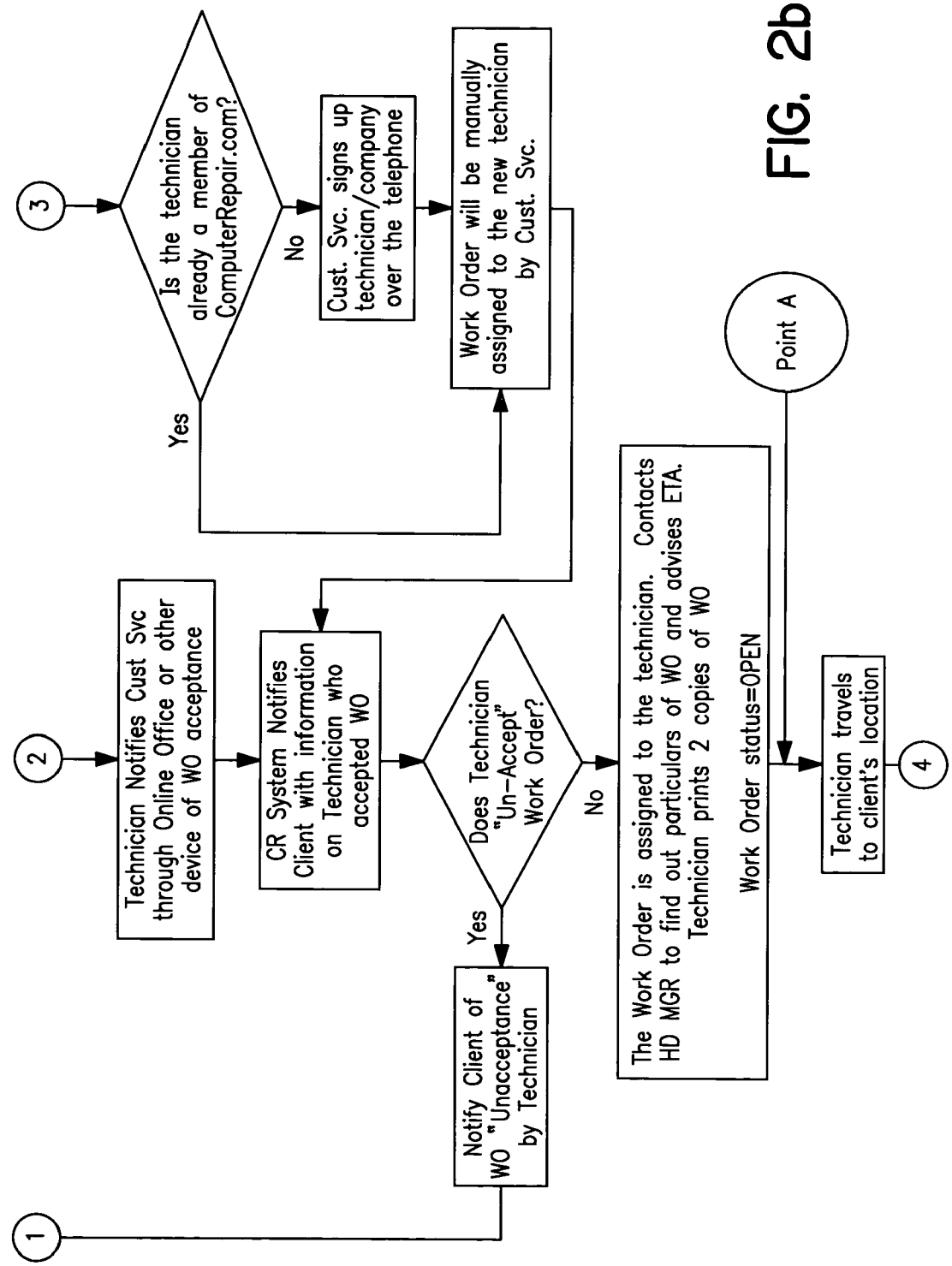
Figure 2C:
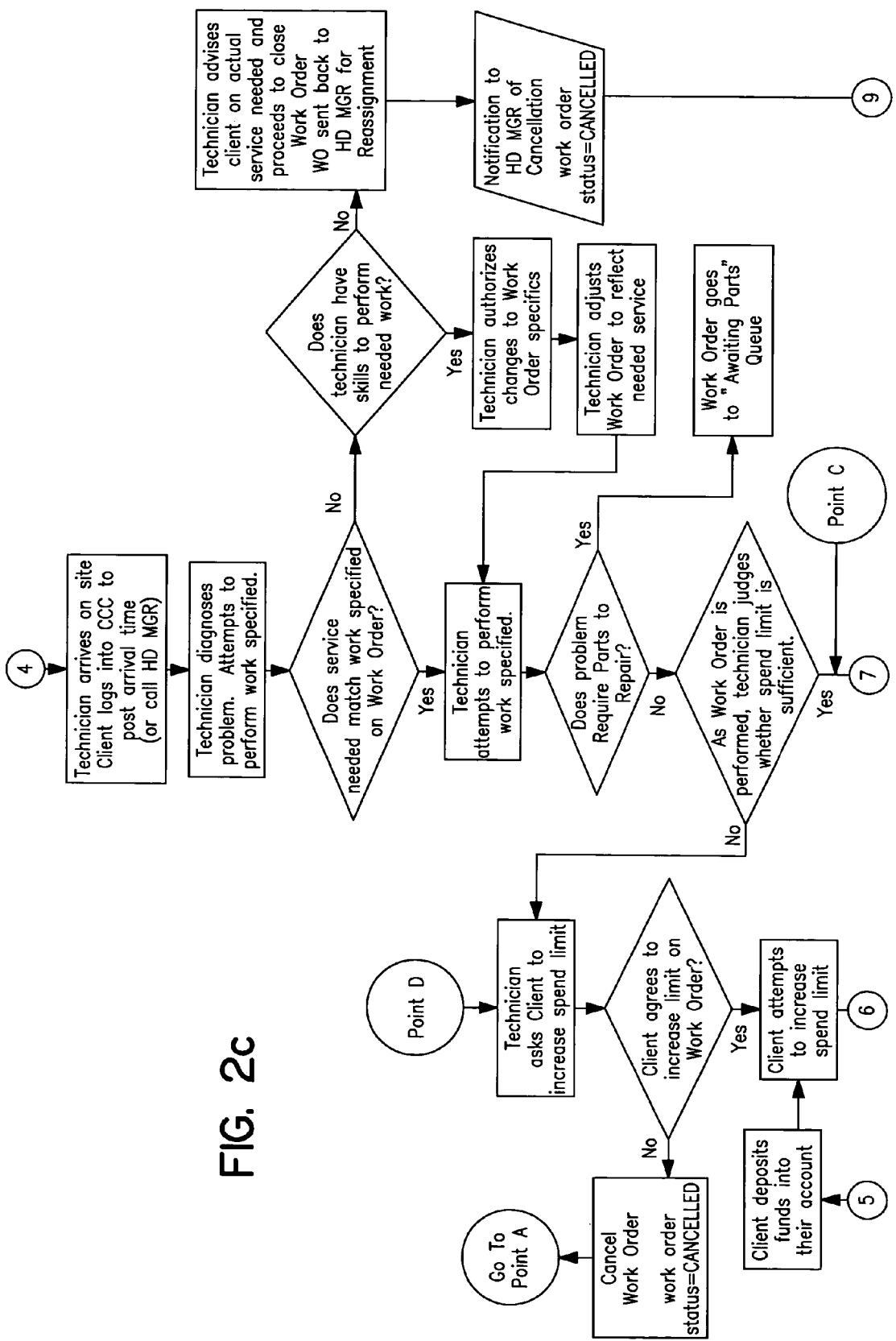
Figure 2D:
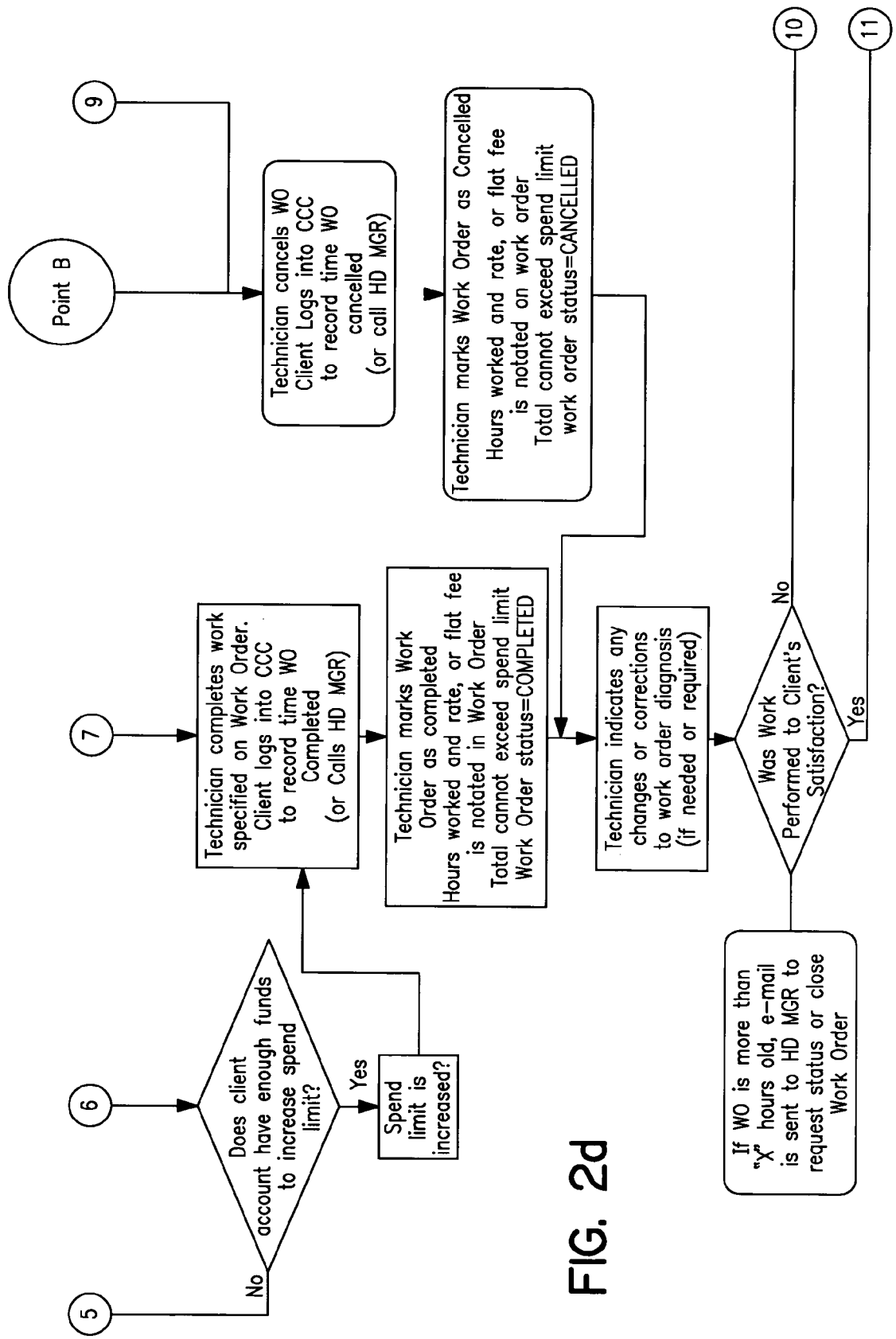
Figure 2F:
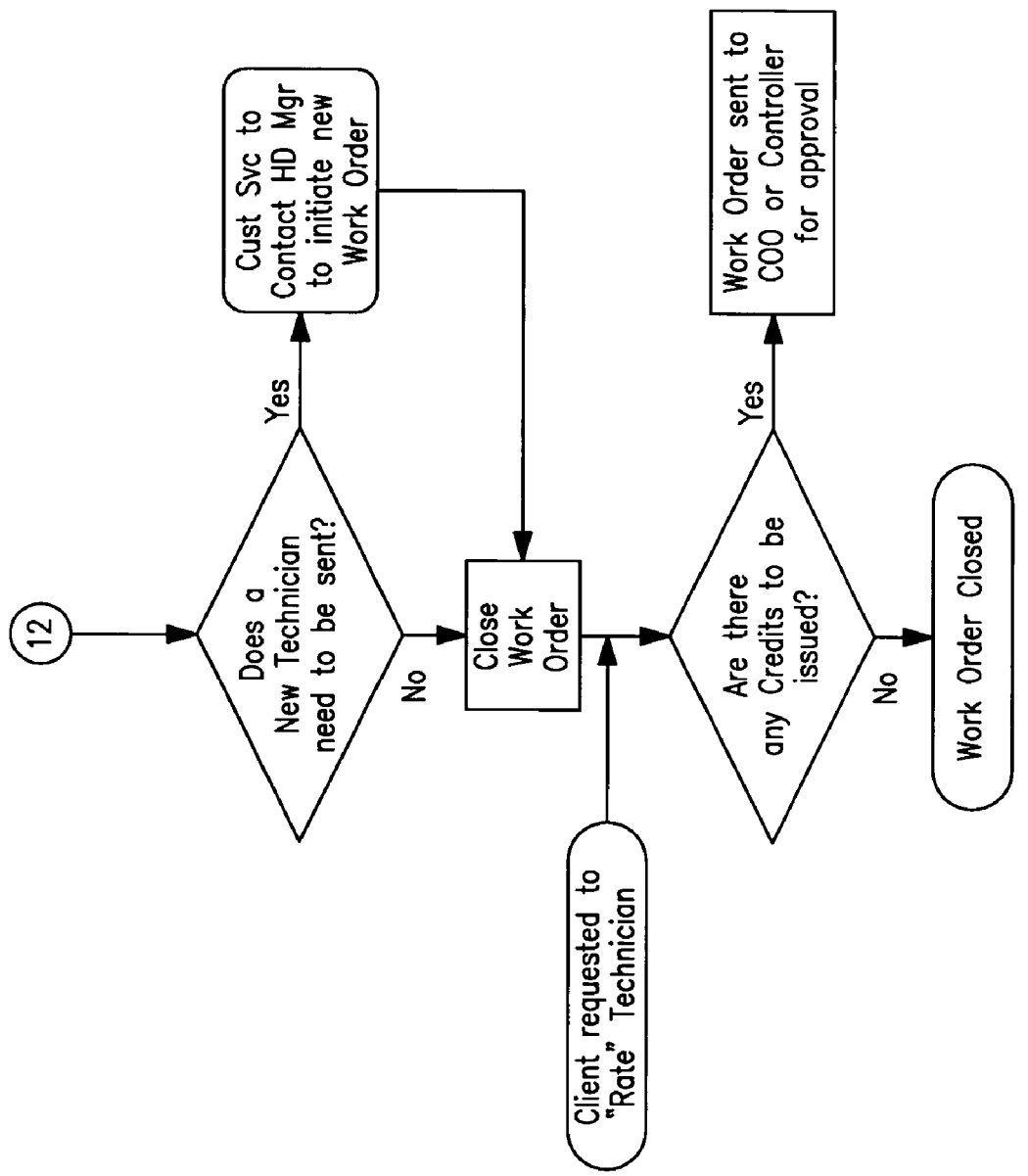
Figure 2G:
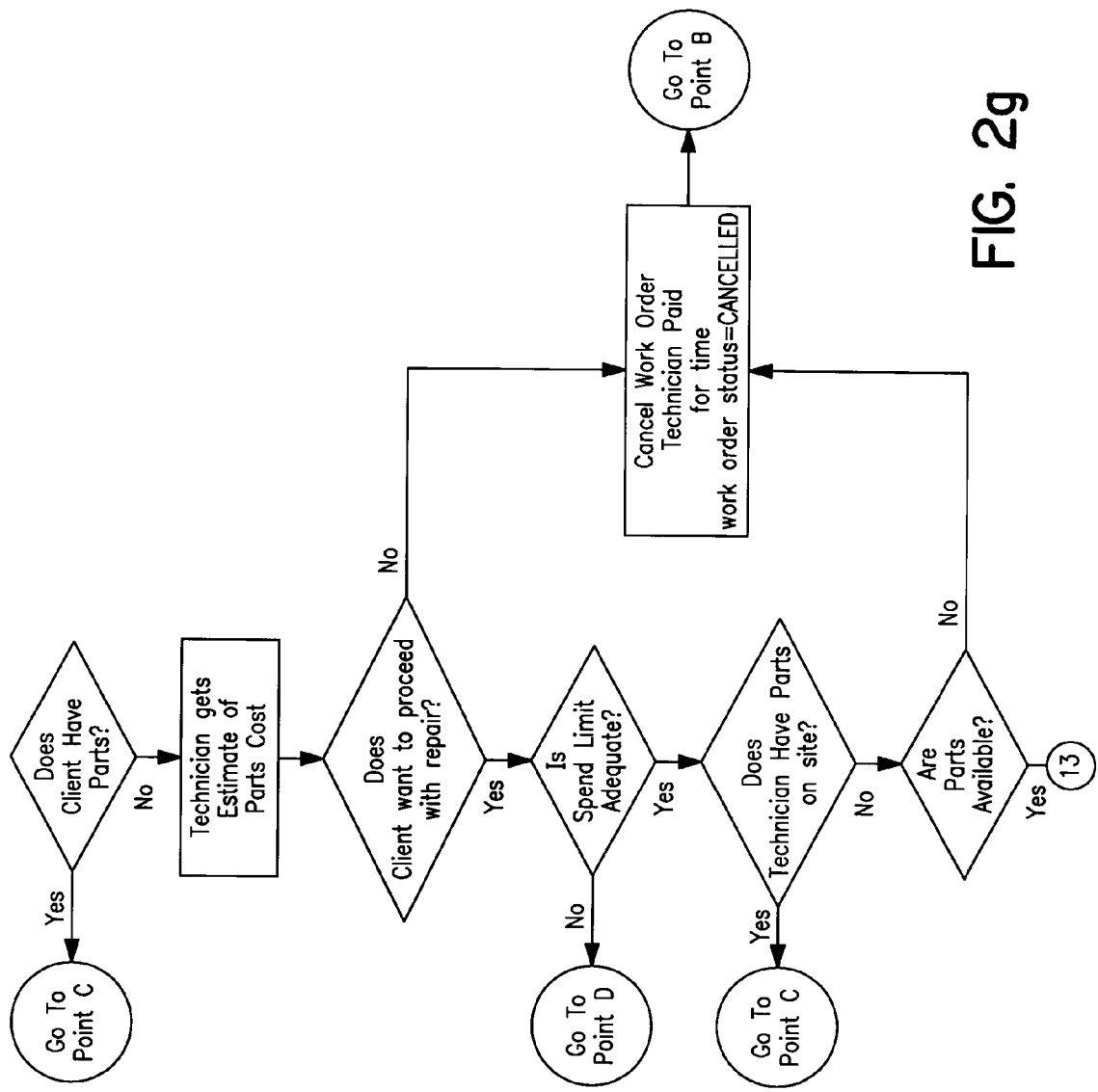
Figure 2H:
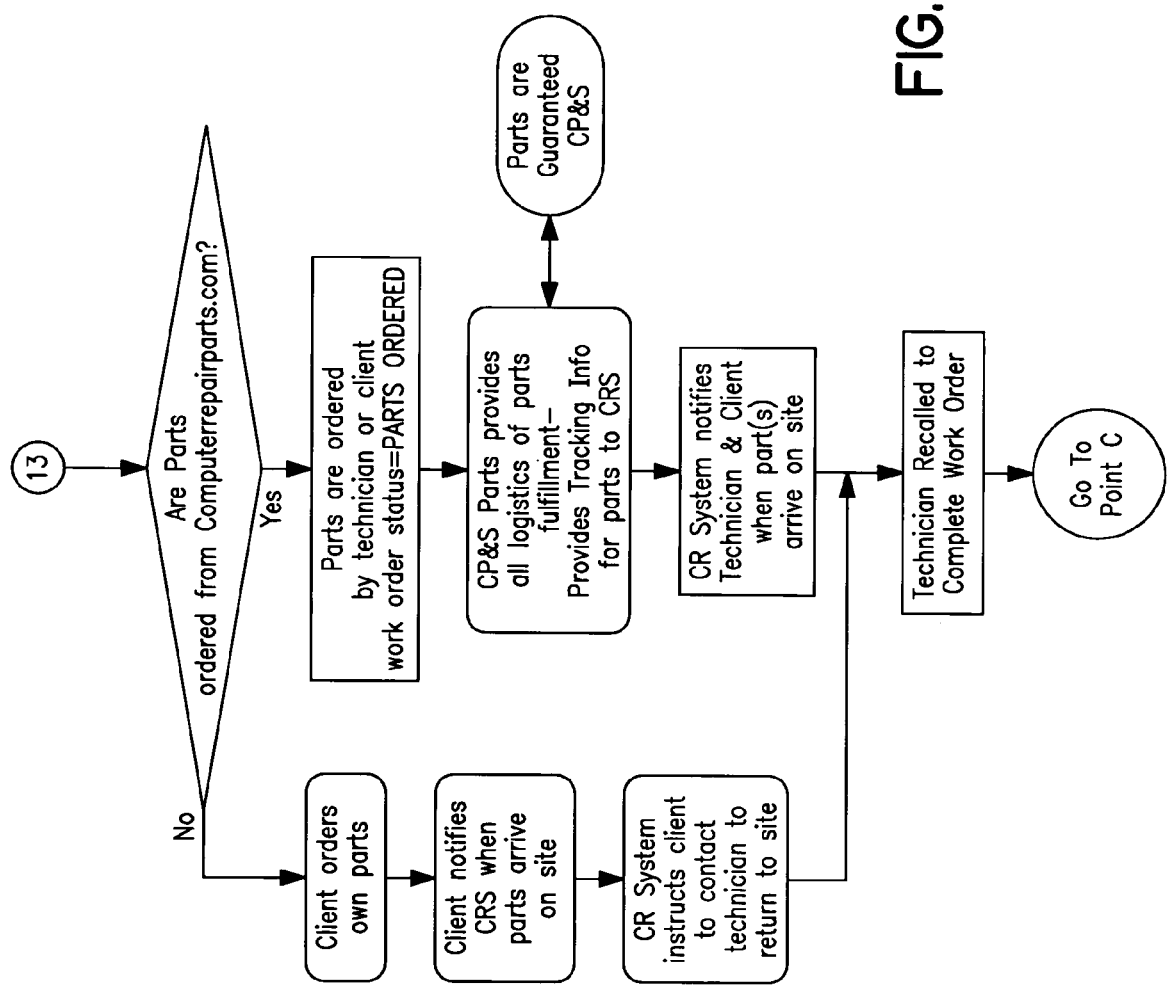

Turning to the drawings, wherein like reference numerals refer to like elements, an exemplary system and method for managing accounts payable is illustrated and described. While described in the context of a system and method for managing service requests, it is to be appreciated that this context is not intended to be limiting. Rather, it is contemplated that the system and method for managing accounts payable described hereinafter may be utilized in connection with any system and method that requires accounts payable management. Still further, the system and method will be described, by way of example only, in the general context of computer executable instructions being executed by one or more processing devices such as a personal computer, mainframe computer, personal-digital assistant ("PDA"), cellular telephone, or the like. Generally, the computer executable instructions reside in program modules which may include routines, programs, objects, components, data structures, etc. that perform particular tasks or implement particular abstract data types. In this regard, those skilled in the art will appreciate that the system and method described hereinafter may also be practiced in distributed computing environments where tasks are performed by various processing devices that are linked through a communication network and where program modules may be located in both local and remote memory storage devices associated with such processing devices.

A network system in which the subject system and method may reside is illustrated by way of example in FIG. 1. In the illustrated network system, a Command Center 20, illustrated in the exemplary form of a computer system, is provided to manage service requests in a manner that will be described in greater detail hereinafter. While described and illustrated as a single computer system, it is again emphasized that the Command Center 20 may be implemented such that tasks are performed by various processing devices that are linked through a communication network such as the Internet, LAN, or the like.

For performing the various tasks, the Command Center 20 preferably includes a processing unit 22 and a system memory 24 which may be linked via a bus 26. Without limitation, the bus 26 may be a memory bus, a peripheral bus, and/or a local bus using any of a variety of bus architectures. By way of further example, the bus 26 may include an architecture having a North Bridge and a South Bridge where the North Bridge acts as the connection point for the processing unit 22, memory 24, and the South Bridge. The North Bridge functions to route traffic from these interfaces, and arbitrates and controls access to the memory subsystem from the processing unit 22 and I/O devices. The South Bridge, in its simplest form, integrates various I/O controllers, provides interfaces to peripheral devices and buses, and transfers data to/from the North bridge through either a PCI bus connection in older designs, or a proprietary interconnect in newer chipsets.

As needed for any particular purpose, the system memory 24 may include read only memory (ROM) 28 and/or random access memory (RAM) 30. Additional memory devices may also be made accessible to the Command Center 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer readable instructions, data structures, program modules and other data for the Command Center 20. Those skilled in the art will further appreciate that other types of computer readable media that can store data may be used for this same purpose. Examples of such media devices include, but are not limited to, magnetic cassettes, flash memory cards, digital videodisks, Bernoulli cartridges, random access memories, nondrives, memory sticks, and other read/write and/or read-only memories.

A number of program modules may be stored in one or more of the memory/media devices. For example, a basic input/output system (BIOS) 44, containing the basic routines that help to transfer information between elements within the Command Center 20, such as during start-up, may be stored in ROM 24. Similarly, the RAM 30 and/or the hard drive 38 may be used to store computer executable instructions comprising an operating system 46, one or more applications programs 48, other program modules 50, and/or program data 52.

A user may enter commands and information into the Command Center 20 through input devices such as a keyboard 54 and/or a pointing device 56. While not illustrated, other input devices may include a microphone, a joystick, a game pad, a scanner, etc. These and other input devices would typically be connected to the processing unit 22 by means of an interface 58 which, in turn, would be coupled to the bus 26. Input devices may be connected to the processor 22 using interfaces such as, for example, a parallel port, game port, firewire, or a universal serial bus (USB). To view information from the Command Center 20, a monitor 60 or other type of display device may also be connected to the bus 26 via an interface, such as video adapter 62. In addition to the monitor 60, the Command Center 20 may also include other peripheral output devices, not shown, such as speakers and printers.

For operating in a networked environment, such as the Internet, the Command Center 20 utilizes logical connections to one or more remote processing devices, such as client computer 64, technician computer 66, database computer 68, and/or financial institution computer 70. In this regard, while the remote processing devices have been illustrated in the exemplary form of computers, it will be appreciated that the remote processing devices may be any type of device having processing capabilities and/or the ability to establish a communication link with the Command Center 20 such as, for example, a cellular telephone. Again, the illustrated processing devices need not be implemented as a single device but may be implemented in a manner such that the tasks performed by the various processing devices are distributed to a plurality of processing devices linked through a communication network. Thus, the remote processing devices may include many or all of the elements described above relative to the Command Center 20 including the memory storage devices and a display device. The connection between the Command Center 20 and the remote processing devices is typically made through a further processing device 72 that is responsible for network routing. Furthermore, within such a networked environment, it will be appreciated that program modules depicted relative to the Command Center 20, or portions thereof, may be stored in the memory storage devices of the remote devices. It will also be understood that interface devices may also be used to establish links with devices lacking processing power, for example, an interactive voice response ("IVR") system may be used to allow a conventional telephone to be interfaced with the Command Center 20.

To manage service requests, acts and symbolic representations of operations will be performed by the processing devices illustrated in FIG. 1. As such, it will be understood that such acts and operations, which are at times referred to as being computer-executed, include the manipulation by the processing devices of electrical signals representing data in a structured form. This manipulation transforms the data or maintains it at locations in the memory system, which reconfigures or otherwise alters the operation of the processing devices 20, 64, 66, 68, and 70 in a manner well understood by those of skill in the art of computer systems. The data structures where data is maintained are physical locations of the memory that have particular properties defined by the format of the data. Nevertheless, while described in the foregoing context, this description is not meant to be limiting as those skilled in the art will further appreciate that various acts and operations described herein may also be implemented in hardware.

By way of further example, the subject system and method may be implemented using a tiered architecture where one tier includes a front-end data base and Web applications running on Web server(s) that constitute an interface between users and the back-end of the system. In this manner, authorized users may access the system through a Web browser having a graphical user interface, for example, provided by a Java applet or as a common HTML page. To secure the system, the Web application may be surrounded by a firewall. The application logic would then constitute a further tier and may reside on a cluster of application servers including all of the capabilities necessary to support multiple transactions simultaneously.

Figure 3:
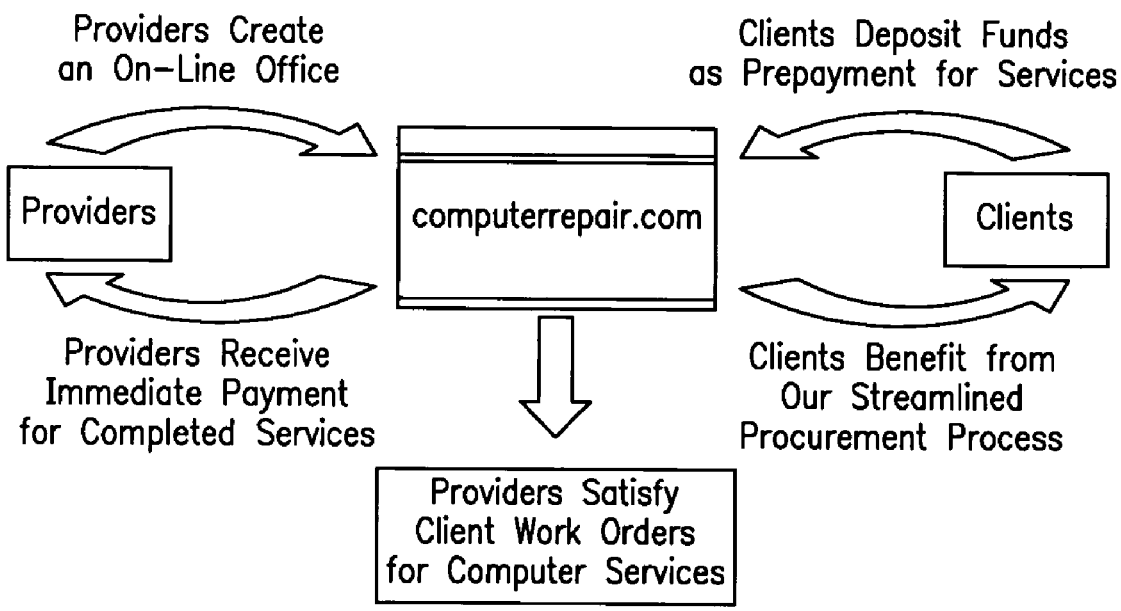
FIG. 3 illustrates a process flow diagram of an exemplary method for managing service requests.

For use in controlling, building, and deploying a scalable workforce to solve service related problems, the Command Center 20 is used to provide an essentially automated system to link service requestors, e.g., corporate help-desk managers, with service providers, e.g., computer repair technicians. To this end, the Command Center 20 operates to provide a networked supply chain management system by which a service requestor may choose, for example via use of the Internet, one or more service providers, monitor the work performed by the service provider, and remit payment to the service provider(s) as generally illustrated in FIG. 3. It is also contemplated that the operator of the Command Center 20 would receive a fee on each transaction from one or both of the service provider (e.g., a percentage of invoice amount) and the service requestor (e.g., a flat fee). It is also contemplated that the operator of the Command Center 20 may provide fee services to companies whereby the operator of the Command Center 20 essentially functions as a centralized help desk and arranges for service providers to meet the needs of service requesters.

Figure 4:
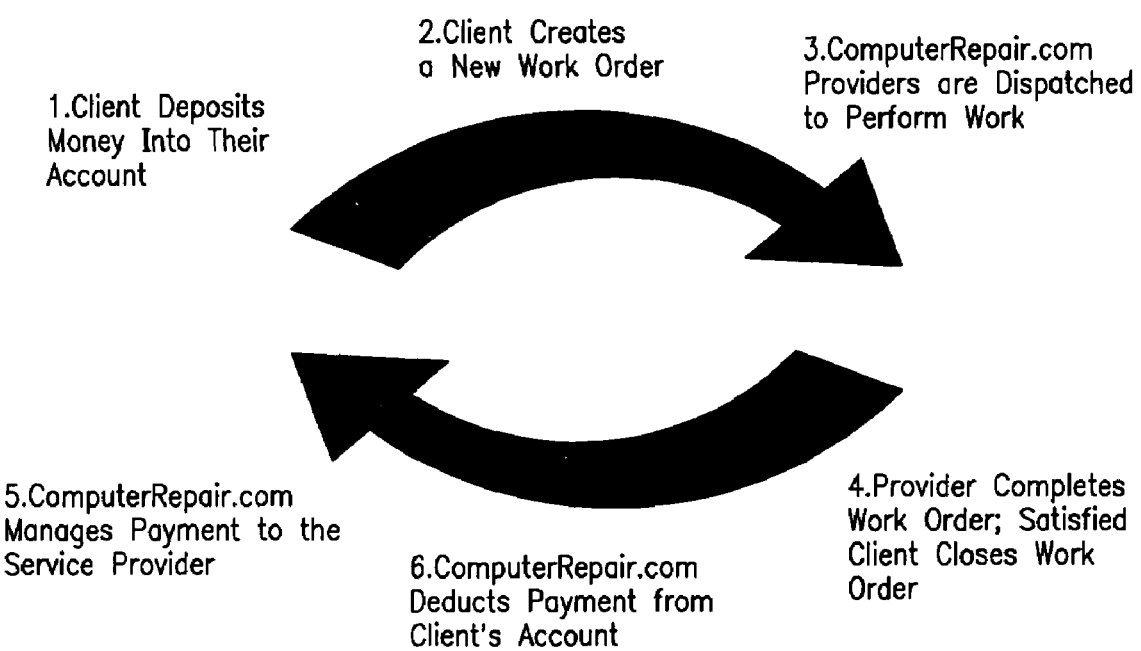
FIG. 4 illustrates a further process flow diagram of the exemplary method for managing service requests with a particular focus on the service requester.

For a service requestor to become a system client, the service requestor preferably registers with the system, for example, by accessing a Web site maintained by the Command Center 20 using client computer 64 and by providing information requested by the Command Center 20. This information may include, but need not be limited to, preferred fees, geographic locations, preferred service providers, preferred hours of 20 availability, preferred certifications, identification of employees that are authorized access, etc. As generally illustrated in FIG. 4, the operator of the Command Center 20 may also require service requestor clients to deposits funds into an account accessible by the Command Center 20 for reasons that are described in further detail hereinafter. The deposit account may include funds deposited by a plurality of service requestor clients. Management of deposit account funds may be performed directly by the Command Center 20 or the Command Center 20 may interact with one or more financial institution computers 70 for this same purpose. Among other things, the registration of the service requestor as a client of the system addresses a need for companies to have a single point of contact and solves the problem of payments to, and management of, multiple vendors. Registration information may be stored and accessed by the Command Center 20 directly or by means of cooperation with a database server computer 68.

Once a service requestor client has registered with the system, service requestor clients will be able to link to the Command Center 20 to perform tasks such as, for example, updating and/or changing registration information, forming a web page, generating a service request, precisely identifying service personnel that the service requestor client desires to meet their service request, managing and following up on service requests, paying the service providers (e.g., requesting a withdraw against their deposit), negotiating service contracts, and/or providing feedback on each service provider. In this regard, service requestor clients may access the Command Center 20 by means of the Internet, e.g., by accessing a Web site page maintained by the Command Center 20, and/or through the use of APIs that function to directly interface client computer 64 with the Command Center 20.

Figure 5:
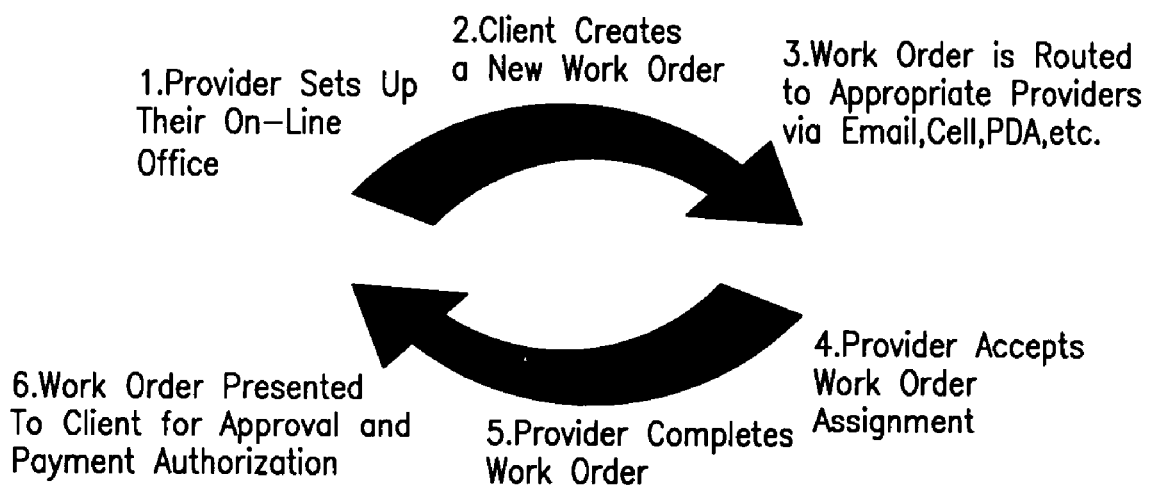
FIG. 5 illustrates a further process flow diagram of the exemplary method for managing service requests with a particular focus on the service provider.
Figure 8A:
Figure 8B:
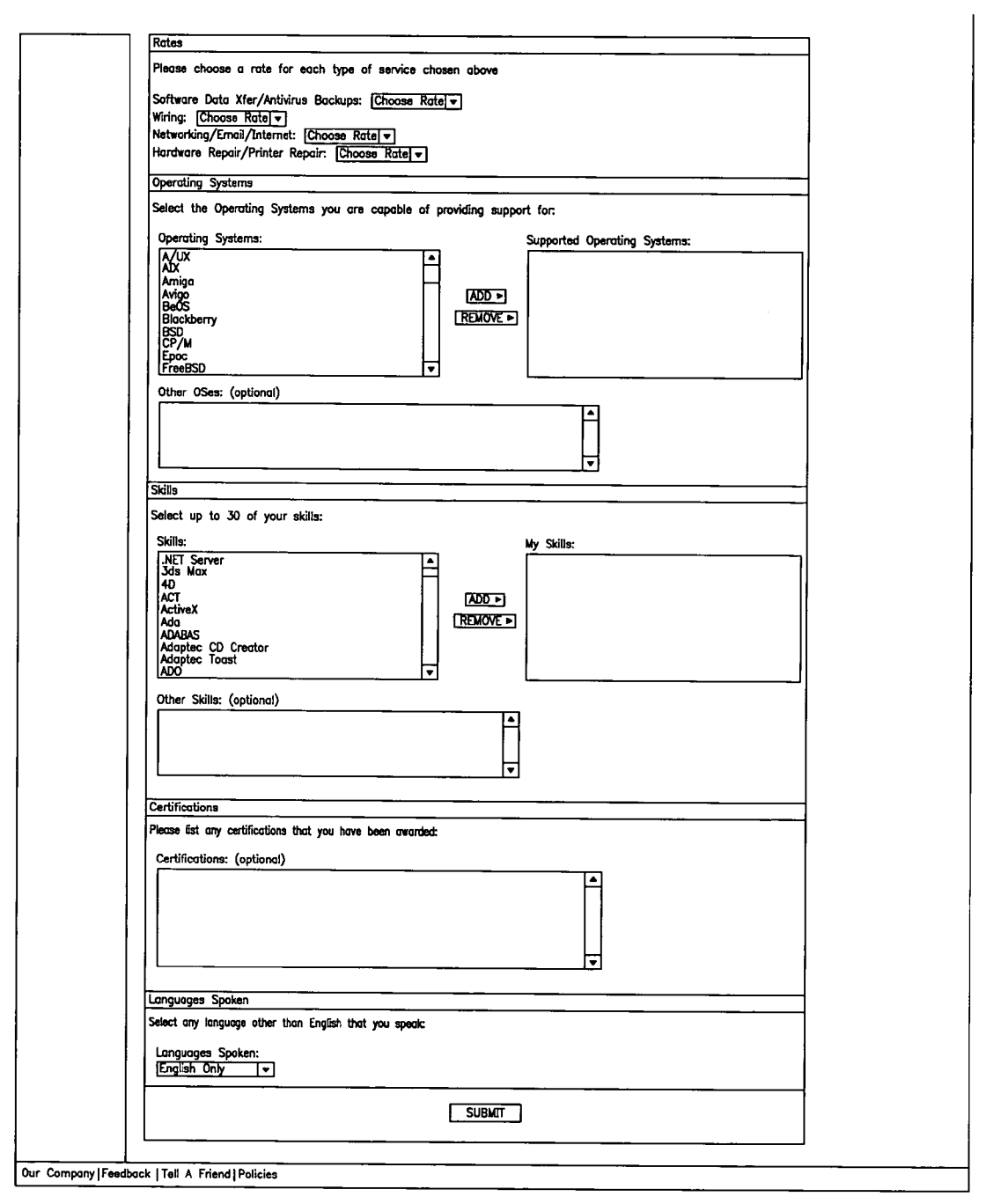

For a service provider to become a system client, as illustrated in FIG. 5, the service provider also preferably registers with the system, for example, by accessing a Web site maintained by the Command Center 20 using technician computer 66 and by providing information requested by the Command Center 20. In this regard, as illustrated by way of example in FIGS. 6-8, the service provider may be requested to provide information to create an account with the Command Center 20 as well as information that will become available via an on-line office to potential service requesters. To these ends, the Command Center 20 may collect information concerning a client service provider company and/or information concerning individual employees of the client service provider. Thus, information collected during the registration process may include contact information for the company and/or individuals, employee skill sets, geographical locations for service areas, availability times, rates, response times, certifications, languages spoken, etc., as is particularly illustrated in FIGS. 6-8. FIG. 10 further illustrates a screen shot of an exemplary page whereby a service provider may manage their on-line office, e.g., to modify a company profile, add team members, change contact information, etc. In this manner, the system provides intuitive on-line tools for marketing each provider and managing workflow.

As noted, once such registration information has been collected, a service provider client will have the equivalent of an on-line office with the Command Center 20 which is accessible by service requestor clients. While information concerning a registered service provider client may also be viewable by the general public, i.e., a non-registered service requestor, such information is preferably limited to prevent a viewer from contacting the service provider outside of the system, e.g., contact information may be prevented from being displayed. Access to the on-line office can be made directly via the Command Center 20 and/or by the service provider client causing URLs relating to the service provider client to be redirected to their on-line office as maintained by the Command Center 20. Again, the on-line office preferably contains information that would be viewable by potential service requestors such that a potential service requestor can discern if a particular client service provider is appropriate for a given service need.

For requesting services, a client service requestor may contact the Command Center 20 to create a work order. In this regard, the Command Center 20 may be contacted via any means such as, for example, accessing the Command Center 20 Web site via a processing device (e.g., client computer 64) contacting Command Center 20 personnel via telephone, PDA, facsimile machine, e-mail, paging network, radio telephone, or the like. In these latter instances, the Command Center 20 personnel may be required to then manually enter the service request information into the Command Center 20 for the purpose of allowing the Command Center 20 to create a work order. An exemplary screen for creating a work order is illustrated by way of example in FIG. 9.

In response to the creation of a work order, the Command Center 20 may cause a fee to be deducted from the account of the client service requester, for example, as a pre-paid retainer or transaction service fee. The fee may be deducted immediately or at some future time, such as upon completion of the service request. At this time, the created work order may also be routed by the Command Center 20 to one or more client service providers. In this regard, a client service requestor may specify one or more intended recipients of the work order. To this end, client service requestors may be provided with the ability to search the existing database of client service providers. Alternatively, the Command Center 20 may identify one or more client service providers for the work order based upon information contained in the work order or otherwise specified by the client service requestor. Information utilized to route work orders in this manner may include a desired or required skill set, hourly rate, availability, geographic location, response time, range or experience, certifications, spend limit, and/or client service provider rating. It will also be appreciated that the information utilized to route work orders may be pre-established by a client service requester, for example during the registration process, or it may be supplied in connection with the request for services.

To direct work orders to intended recipients, the Command Center 20 may cause work orders to be transmitted to one or more of a technician computer 66, telephone, PDA, facsimile machine, e-mail account, pager, etc. of a client service provider. The recipient client service providers may then respond to the Command Center 20 to indicate a desire to answer the service request. Preferably, the client service provider that is first to respond to the Command Center 20 and which is qualified to perform work associated with the service request is awarded the service request contract. Prior to and/or after the assigning of a service request, a client service requestor may access the Command Center 20 to monitor all service logistics in real-time. For this purpose, any received service requests and/or work orders may be assigned a look-up number which would be transmitted to the service requester. The service requestor may then indicate the look-up number to access status information maintained by the Command Center 20.

When the service request that is the subject of the work order is completed by the client service provider, information concerning the completed service request is provided by the client service provider to the Command Center 20 using any of the communication methodologies described previously. The Command Center 20 may then issue a notification to the client service requestor which notification would contain information relevant to the completion of the service request/work order. Again, the service request/work order completion notification may be issued to the client service requester by being transmitted to one or more of a client computer 64, telephone, PDA, facsimile machine, e-mail account, pager, etc. of the client service requestor.

The client service requestor may transmit a response to the Command Center 20 to confirm the completion of the service request and the satisfaction of the client service requestor with respect to the work performed. At this time, the client service requestor may also authorize the Command Center 20 to convert the work order to an invoice so as to allow the Command Center 20 to access the account of the client service requestor for the purpose of issuing payment to the client service provider. In this regard, payment may be made electronically to an account of the client service provider through the electronic transfer of funds, as described hereinafter, by alternative means such as the issuance of a check, or the like. A client service requester may additionally access the Command Center 20 to complete a survey regarding the completion of the service request/work order by the client service provider. Information collected in such a survey may then be used to establish a rating for the client service provider for use in the future assignments of work orders, for example by providing an overall rating and ratings for one or more skill sets, punctuality, professionalism, etc. as illustrated in FIG. 11.

In instances where the service provider is unable to complete the work order, for example, if a particular part must be replaced that needs to be specially ordered, the system may allow for the service provider to request that the work order be renegotiated with the service requester for the purpose of addressing these additional needs. This negotiation may be done via message exchanges through the system or done directly between the parties. In either case, the system should be notified as to any changes or alterations to the work order so as to allow for the updating of the work order to ensure proper accounting. It is also contemplated that, in this case, the parties may agree that the work order is completed for purposes of accounting only and that the service requester will issue a further service request for the purpose of having the repair work completed in actuality.

From the foregoing, it will be appreciated that the subject system and method has, among others, the advantages of: providing customers with a single point of contact, responsibility, and billing. It also has the advantage of providing a convenient means, e.g., the Internet, for accessing services. In the context of corporate customers, the system allows these customer to electronically control and monitor the service process; to choose service provider(s) in various regions, by certifications (e.g., by Dell, Compaq, Microsoft, etc.), by range of fees, by range of experience, etc. to insure proper and timely services throughout the United States; etc. The subject system and method also has the advantage of providing service requestors with a generic catalog of services, possibly at substantially reduced prices. Still further, the subject system and method may allow access to certain computer parts providers and or providers of additional services that may be required.

With respect to the service providers, the subject system and method has, among others, the advantage of providing for a steady flow of work (i.e., in the form of work orders) whereby service provider personnel will be able to better manage their daily schedules, receive payments and earn more consistent pay while providing faster response times to end users.

Still further, it is contemplated that service requestors and service providers may use information contained with the subject system to interact directly. Once service requesters and service providers are connected in this manner, the remaining functionality of this system may still be utilized so as to maintain centralized management of the service and/or payment processes.

For managing the accounts payable process, a provider of services and/or goods (i.e., a vendor with an established on-line office account) is preferably provided with the ability to access accounts payable information, initiate payments, etc., as will be described in greater detail hereinafter. While the description of the accounts payable process will be in the context of the command center system described above, it is to be understood that the principles described hereinafter could also be performed through direct interactions between a requestor of services and/or goods and providers of services and/or goods. Accordingly, the description that follows is intended to be illustrative only and is not intended to be otherwise read in a limiting manner.

Figure 6:
Figure 12:
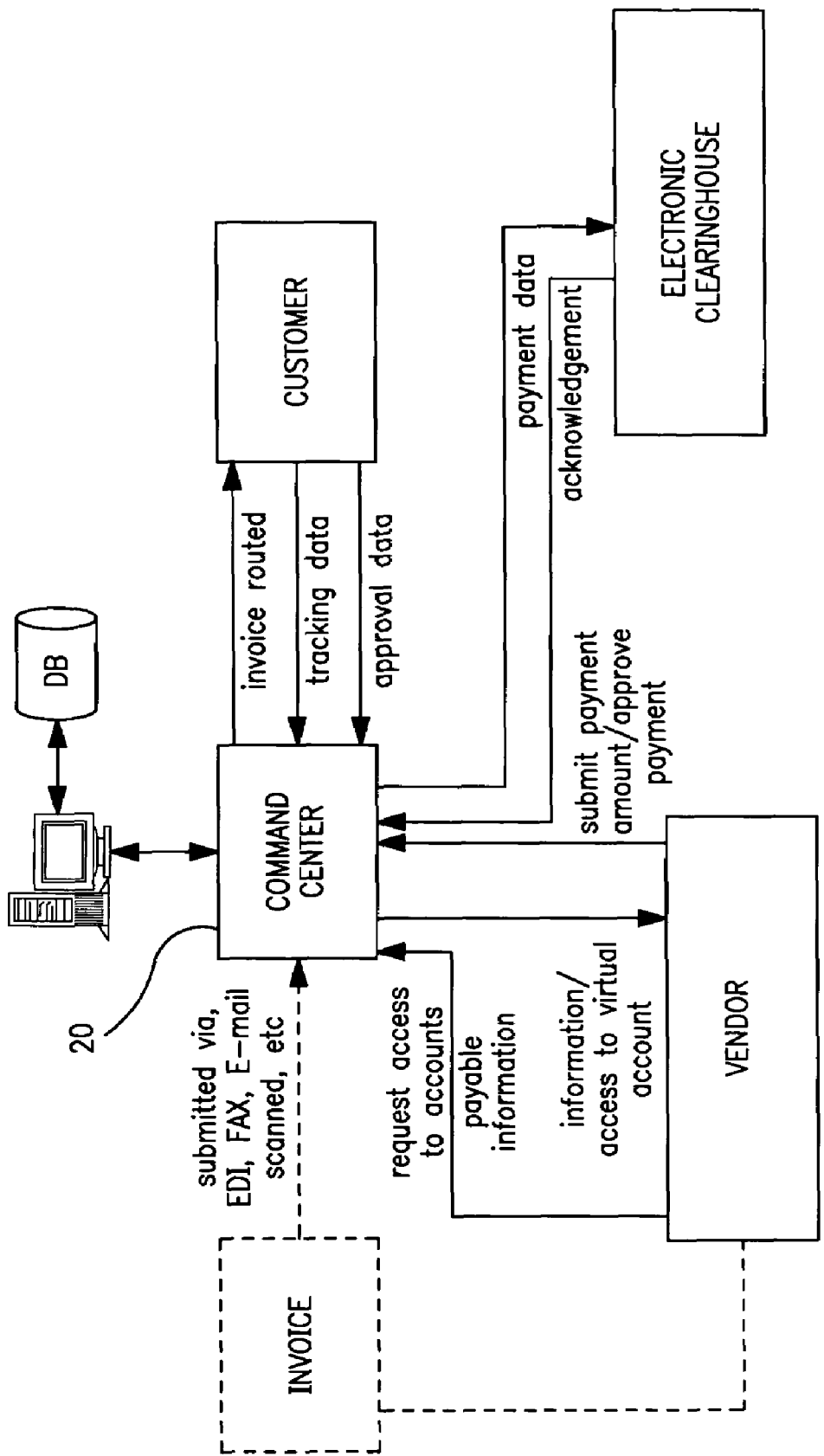
FIG. 12 illustrates an exemplary system and method for managing accounts payable.

As illustrated in FIG. 12, a typical accounts payable process commences with the issuance of an invoice from a system registered vendor. As will be appreciated, the invoice may be issued upon provision of requested services, shipment of goods, etc. Furthermore, as illustrated in FIG. 6, the invoice may be provided by the vendor electronically (e.g., via EDI, facsimile, email, etc.) or physically (e.g., via mail) without limitation. In this illustrated example, the invoice is provided to the operator of the command center 20 whereupon it is entered into the command center system and, preferably stored within a database 68 of invoices so as to be cross-referenceable to both the requestor of services and/or goods and the vendor. Cross-reference may be by means of designators provided to the requestor and the provider during the registration process described above.

In the example system, a received invoice is further preferably routed to the requester whereby the invoice may be approved. In this regard, the invoice may be routed to the requestor generally and/or to one or more person(s) that have been designated as having invoice approval authority (e.g., management and/or accounting personnel). The intended recipients of invoices may be provided to the central controller system during the requestor registration process. Preferably, the invoice is routed (to any one or more persons in the approval chain) using electronic means, such as email or the like. Furthermore, it may be desirable to track movement of the invoice whereby the tracking information may then be maintained within the database 68 for ease in discerning the current location/present status of the invoice.

Once the invoice has been properly authorized for payment, the command center 20 is preferably notified whereby the command center 20 may function to allocate the amount of the invoice to the vendor that issued the invoice. To this end, within the command center system, each customer and each vendor is preferably provided with a virtual account. Thus, when the invoice is approved, the command center 20 may function to debit the virtual account of the appropriate customer while crediting the virtual account of the appropriate vendor. As described previously, since the customer may be required to maintain and fund an account with the command center 20, the virtual account of the customer would preferably track the amounts within this funded account. Thus, if the virtual account of the customer is under-funded, the control center 20 may notify the customer of a need to increase their amount on deposit in order to meet the current payment requirement(s) and, possibly, for further work to be authorized on behalf of the customer. As a means for minimizing the likelihood of fraud, the system may only allow a predetermined amount of money to be transferred between virtual accounts over a predetermined period of time, e.g., a limit of $750.00 per day from a customer to a vendor.

During this process, the vendor may be provided with an opportunity to access the records maintained within the command center 20 at their convenience to view information concerning the accounts payable process, e.g., to view invoice status, virtual account status, etc. In this manner, the vendor may quickly and easily discern where in the invoice approval process any invoice may be. Furthermore, once an invoice has been approved and funds allocated, the vendor may request that all or part of the allocated funds be transferred to a real account owned by the vendor.

To initiate the transfer of funds from the deposit account maintained by the operator of the command center 20 to the vendor real account, the vendor may be provided with the ability to write themselves a virtual check against their virtual account. In this regard, all that may be required from the vendor is the amount that is to be paid from the virtual account. This amount may be limited to a predetermined amount of money over a predetermined period of time, e.g., the vendor may only be able to withdraw $750.00 per day from their virtual account. The remaining information needed for payment to the vendor may be supplied automatically by the centralized control system 20. For example, payee fields (e.g., company or individual name, payee account, etc.) may have been previously supplied to the centralized control system 20 at the time that the vendor registered with the centralized control system 20. In this manner, once the virtual check is prepared to the satisfaction of the vendor, the vendor may, for example, click on a "submit check" button or the like provided in a graphical user interface to initiate processing of the virtual check. Check records are preferably maintained within the database 68 so as to be accessible and viewable by a vendor, as a virtual check ledger.

To process the virtual check, each submitted virtual check is preferably batched into a NACHA file and submitted to a financial institution associated with the ACH Network. Since a description of such an automated clearinghouse system may be found at, for example, "http://www.nacha.org/," a more detailed explanation will not be provided herein for the sake of brevity. Nevertheless, the submittal of the virtual check to the financial institution will result in the electronic transfer of funds from an account associated with the customer to the account designated by the vendor. In the illustrated case, the funds would be withdrawn from an account maintained by the operator of the command center 20 in which deposits from customers are maintained. It will be appreciated that the electronic transfer of funds may also be accomplished in a similar manner by means of the vendor using a virtual credit card, pay pal, direct indication of a wireless account, etc. without limitation. Thus, it will be appreciated that the described system and method for managing accounts payable has, among others, the advantages of providing vendors with the ability to monitor their accounts and invoices and to ensure secure payment of vendor fees.

It will also be appreciated that the principles of the described system may also be utilized to, for example, allow an operator of the command center 20 to initiate funding of a customer account. In such a case, the operator of the command center 20 may access a similar virtual check writing utility, which may have appropriate limits, to cause an electronic transfer of funds from a real account owned by the customer to the deposit account maintained by the operator of the command center. In the case of such electronic transfers, any amount transferred would be preferably reflected in the virtual account for that customer client.

While various concepts have been described in detail, it will be appreciated by those skilled in the art that various modifications and alternatives to those concepts could be developed in light of the overall teachings of the disclosure. For example, it is contemplated that service requesters and service providers may use information contained with the subject system to interact directly. Once service requestors and service providers are connected in this manner, the remaining functionality of this system will still be utilized so as to maintain centralized management of the service and payment process. Furthermore, while described in the context of managing computer related services, it will be appreciated that the concepts described herein may be used to manage provision of any type of services. By way of example only, the subject system and method may be used to manage the placement of temporary employees, to manage the placement of nurses, etc. where the work order would request the services of the temporary employee, nurse, (e.g., specifying a location, particular need, time, and the like) etc. As such, the particular concepts disclosed are meant to be illustrative only and not limiting as to the scope of the invention which is to be given the full breadth of the appended claims and any equivalents thereof.

What is claimed is:

1. A method for managing accounts payable, comprising:
    receiving at a third party a request for services from a customer, the request for services specifying a spend limit for a requested service;
    providing functionality for a vendor to request from the customer an increase in the spend limit through message exchanges via the third party;
    receiving at the third party an invoice from the vendor, the invoice including an invoiced dollar amount corresponding to the spend limit for the requested service and at least a portion of the requested service performed by the vendor;
    routing the invoice from the third party to a customer for approval of the portion of the requested service performed by the vendor;
    receiving at the third party instructions from the customer to initiate payment of at least a portion of the invoiced dollar amount based on the customer's approval of the portion of the requested service performed by the vendor;
    allocating at the third party the approved portion of the invoiced dollar amount to a virtual account associated with the vendor and maintained by the third party;
    receiving at the third party a request from the vendor to have at least a portion of the allocated dollar amount transferred from a deposit account maintained by the third party to a real account owned by the vendor;
    using a computer at the third party to initiate an electronic transfer of the requested portion of the allocated dollar amount from the deposit account maintained by the third party to the real account owned by the vendor; and
    de-allocating at the third party the transferred requested portion of the allocated dollar amount from the virtual account associated with the vendor and maintained by the third party.

2. The method as recited in claim 1, wherein the deposit account maintained by the third party includes deposit amounts from a plurality of customers.

3. The method as recited in claim 2, comprising receiving at the third party deposits from the customer for placement into the deposit account maintained by the third party.

4. The method as recited in claim 1, comprising electronically receiving the invoice.

5. The method as recited in claim 1, wherein the request from the vendor to have at least a portion of the allocated dollar amount transferred comprises the vendor writing a virtual check.

6. The method as recited in claim 5, comprising using data maintained by the third party to automatically complete all information required within the virtual check except the payment amount.

7. The method as recited in claim 5, comprising maintaining with the third party a record of written virtual checks.

8. The method as recited in claim 1, comprising placing a limit on the allocated dollar amount.

9. The method as recited in claim 8, wherein the limit comprises a daily limit.

10. The method as recited in claim 1, wherein the electronic transfer occurs within an electronic financial network.

11. The method as recited in claim 1, comprising maintaining with the third party a virtual account associated with the customer, the virtual account including an amount representative of amounts provided by the customer and included within the deposit account maintained by the third party.

12. The method as recited in claim 1, comprising storing the invoice with the third party.

13. The method as recited in claim 12, wherein the invoice is provided with an identifier representative of the vendor.

14. The method as recited in claim 12, wherein the invoice is provided with an identifier representative of the customer.

15. The method as recited in claim 1, comprising tracking movement of the invoice during a payment process.

16. The method as recited in claim 1, wherein the request is received via a Web site.

17. A third party system for managing accounts payable comprising:
    a system memory storing executable instructions, and
    a processing unit for executing the instructions,
    wherein the processing unit executes the instructions so that the third party system performs steps comprising:
        receiving at the third party system a request for services from a customer, the request for services specifying a spend limit for a requested service;
        providing functionality for a vendor to request from the customer an increase in the spend limit through message exchanges via the third party system;
        receiving at the third party system an invoice from the vendor, the invoice including an invoiced dollar amount corresponding to the spend limit for the requested service and at least a portion of the requested service performed by the vendor;
        routing the invoice from the third party system to the customer for approval of the portion of the requested service performed by the vendor;
        receiving at the third party system instructions from the customer to initiate payment of at least a portion of the invoiced dollar amount based on the customer's approval of the portion of the requested service performed by the vendor;
        allocating the authorized portion of the invoiced dollar amount to a virtual account associated with the vendor and maintained by the third party system;
        receiving a request from the vendor to have at least a portion of the allocated dollar amount transferred from a deposit account maintained by the third party system to a real account owned by the vendor;
        initiating an electronic transfer of the requested portion of the allocated dollar amount from the deposit account maintained by the third party system to the real account owned by the vendor; and
        de-allocating the transferred requested portion of the allocated dollar amount from the virtual account associated with the vendor and maintained by the third party system.

18. The readable media as recited in claim 17, wherein the deposit account maintained by the third party includes deposit amounts from a plurality of customers.

19. The readable media method as recited in claim 17, wherein the processing unit executes the instructions so that the third party system performs the step of electronically receiving an invoice including the invoiced dollar amount.

20. The readable media as recited in claim 17, wherein the processing unit executes the instructions so that the third party system performs the step of allowing the vendor to write a virtual check to specify the requested portion of the allocated dollar amount.

21. The readable media as recited in claim 20, wherein the processing unit executes the instructions so that the third party system performs the step of using data maintained by the third party to automatically complete all information required within the virtual check except the payment amount.

22. The readable media as recited in claim 20, wherein the processing unit executes the instructions so that the third party system performs the step of maintaining a vendor accessible record of written virtual checks payable to the vendor.

23. The readable media as recited in claim 17, wherein the processing unit executes the instructions so that the third party system performs the step of placing a limit on the allocated dollar amount.

24. The readable media as recited in claim 23, wherein the limit comprises a daily limit.

25. The readable media as recited in claim 17, wherein the step of initiating an electronic transfer occurs within an electronic financial network.

26. The readable media as recited in claim 17, wherein the processing unit executes the instructions so that the third party system performs the step of storing an invoice that includes the invoiced dollar amount.

27. The readable media as recited in claim 26, wherein the invoice is provided with an identifier representative of the vendor.

28. The readable media as recited in claim 26, wherein the invoice is provided with an identifier representative of the customer.

29. The readable media as recited in claim 17, wherein the processing unit executes the instructions so that the third party system performs the step of allowing the vendor to track movement of an invoice including the invoiced dollar amount during a payment process with the customer.

30. The readable media as recited in claim 17, wherein the processing unit executes the instructions so that the third party system performs the step of providing a Web based graphical user interface by which the request is received.

31. A system for managing accounts payable, comprising:
a third party computer system in communication with a vendor computer via a communication network, the third party computer system including
a system memory storing executable instructions, and
a processing unit for executing the instructions,
wherein executing the instructions includes
receiving at the third party computer system a request for services from a customer, the request for services specifying a spend limit for a requested service;
providing functionality for a vendor to request from the customer an increase in the spend limit through message exchanges via the third party computer system;
receiving at the third party computer system an invoice from the vendor, the invoice including an invoiced dollar amount corresponding to the spend limit for the requested service and at least a portion of the requested service performed by the vendor;
routing the invoice from the third party computer system to the customer for approval of at least a portion of the requested service performed by the vendor;
receiving at the third party computer system instructions from the customer to initiate payment of at least a portion of the invoiced dollar amount based on the customer's approval of the portion of the requested service performed by the vendor;
allocating the authorized portion of the invoiced dollar amount to a virtual account associated with the vendor and maintained by the third party computer system upon receiving the payment authorization from the customer to pay that portion of the invoiced dollar amount;
receiving a request from the vendor computer to have at least a portion of the allocated dollar amount transferred from a deposit account maintained by the third party computer system to a real account owned by the vendor;
initiating an electronic transfer of the requested portion of the allocated dollar amount from the deposit account maintained by the third party computer system to the real account owned by the vendor; and
de-allocating the transferred requested portion of the allocated dollar amount from the virtual account associated with the vendor and maintained by the third party computer system.

32. The system as recited in claim 31, wherein the instructions to initiate payment are electronically received by the third party computer system.

33. The system as recited in claim 31, wherein executing the instructions further includes electronically receiving the invoice including the invoiced dollar amount.

34. The system as recited in claim 31, wherein executing the instructions further includes allowing the vendor to write a virtual check to specify the requested portion of the allocated dollar amount.

35. The system as recited in claim 34, wherein executing the instructions further includes using data maintained with the system to automatically complete all information required within the virtual check except the payment amount.

36. The system as recited in claim 31, wherein executing the instructions further includes maintaining a vendor accessible record of written virtual checks payable to the vendor.

37. The system as recited in claim 31, wherein executing the instructions further includes placing a limit on the allocated dollar amount.

38. The system as recited in claim 37, wherein the limit comprises a daily limit.

39. The system as recited in claim 31, wherein the electronic transfer occurs within an electronic financial network.

40. The system as recited in claim 31, wherein executing the instructions further includes storing the invoice that includes the invoiced dollar amount.

41. The system as recited in claim 40, wherein the invoice is provided with an identifier representative of the vendor.

42. The system as recited in claim 40, wherein the invoice is provided with an identifier representative of the customer.

43. The system as recited in claim 31, wherein executing the instructions further includes providing a means for the vendor to track movement of the invoice including the invoiced dollar amount during a payment process with the customer.

44. The system as recited in claim 31, wherein executing the instructions further includes providing a Web based graphical user interface by which the request is received.

45. A method for managing accounts payable, comprising:
receiving at a third party a request for services from a customer, the request for services specifying a spend limit for a requested service;
providing functionality for a vendor to request from the customer an increase in the spend limit through message exchanges via the third party;
receiving at the third party an invoice from the vendor, the invoice including an invoiced dollar amount corresponding to the spend limit for the requested service and at least a portion of the requested service performed by the vendor;

routing the invoice from the third party to the customer for approval of at least a portion of the requested service performed by the vendor;

receiving at the third party instructions from the customer to initiate payment of at least a portion of the invoiced dollar amount based on the customer's approval of the portion of the requested service performed by the vendor; and using a computer at the third party to initiate an electronic transfer of the approved portion of the allocated dollar amount from a deposit account maintained by the third party to an account owned by the vendor.

* * * * *